United States Statutory Invention Registration [19]

[11] Reg. Number: H489

Brodman et al. [43] Published: Jul. 5, 1988

[54] CHEMICAL AGENT DETECTING PROJECTILE

[75] Inventors: Bruce W. Brodman, Stroudsburg, Pa.; Thomas A. Doris, Jr., Sparta, N.J.

[73] Assignee: The United States of America as represented by the Secretary of the Army, Washington, D.C.

[21] Appl. No.: 936,681

[22] Filed: Dec. 1, 1986

[51] Int. Cl.[4] ..... F42B 13/16; F42B 11/00

[52] U.S. Cl. ..... 102/503; 102/293; 102/513; 102/516

[58] Field of Search ..... 102/501, 513–516, 102/503; 102/293

[56] References Cited

U.S. PATENT DOCUMENTS

| | | | |
|---|---|---|---|
| 2,336,143 | 12/1943 | Werme | 102/514 |
| 3,726,495 | 4/1973 | Gawlick et al. | 102/503 |
| 3,972,291 | 8/1976 | Braun, Jr. et al. | 102/513 |
| 4,094,711 | 6/1978 | Ramnarace | 102/513 |
| 4,130,061 | 12/1978 | Boggs | 102/501 |
| 4,381,712 | 3/1983 | Black | 102/503 |
| 4,597,810 | 7/1986 | Trickel et al. | 102/513 |

FOREIGN PATENT DOCUMENTS

| | | | |
|---|---|---|---|
| 19912 | of 1893 | United Kingdom | 102/503 |

*Primary Examiner*—Harold J. Tudor

*Attorney, Agent, or Firm*—Robert P. Gibson; Edward Goldberg; Edward F. Costigan

[57] ABSTRACT

A projectile capable of detecting toxic agents in the atmosphere at long range, particularly halogen containing materials, containing therein a pyrotechnic composition comprising magnesium, calcium resinate and strontium nitrate. The projectile has an orifice therethrough along its longitudinal axis to enable the projectile to sample the atmosphere as it travels therethrough.

2 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CHEMICAL AGENT DETECTING PROJECTILE

GOVERNMENT RIGHTS

The invention described herein may be manufactured, used and licensed by or for the Government for Governmental purposes without the payment to us of any royalties thereon.

BACKGROUND OF THE INVENTION

In times of war and during certain emergencies caused by natural phenomenon or accidents, the atmosphere becomes polluted with toxic chemicals. In order to be able to react to the pollutants and ameliorate their effects, it is necessary to analyze the atmosphere to detect the presence of such chemicals and their probable nature. Many efforts to solve these problems have been attempted and many are successful technically, e.g. sampling particulate fallout by mass spectrometer or atmospheric sampling by gas chromographic techniques by placing the detectors in remote areas where power requirements are severe and retrieval difficult.

Thus there is no practical means now in use for detecting toxic chemicals in the atmosphere at long range.

SUMMARY OF THE INVENTION

This invention relates to a tracer projectile which permits long range detection of a toxic atmosphere. The projectile contains a pyrotechnic composition whose flame acts as a flame photometer when passing through an atmosphere in which there are certain chemicals detectable by the particular pyrotechnic composition in the projectile. The projectile can be propelled from any weapon which is capable of propelling a tracer bullet. The projectile is generally cylindrical and has an axial orifice through its center. When the projectile is travelling through the atmosphere, air goes through the orifice and contacts the flame of the pyrotechnic composition. If the atmosphere contains a material which produces a change in the flame of the pyrotechnic composition when such a material comes into contact with it, then the observer knows the atmosphere is not normal and is probably toxic. For example, the preferred pyrotechnic composition of this invention normally burns with a specific flame color, pale pink, but when it comes into contact with air contaminated with a halogen containing toxic agent, the flame changes to a deeper red color.

BRIEF DESCRIPTION OF DRAWING

The FIGURE is a side sectional view of a typical projectile of this invention.

DETAILED DESCRIPTION OF THE INVENTION

Figure 1:
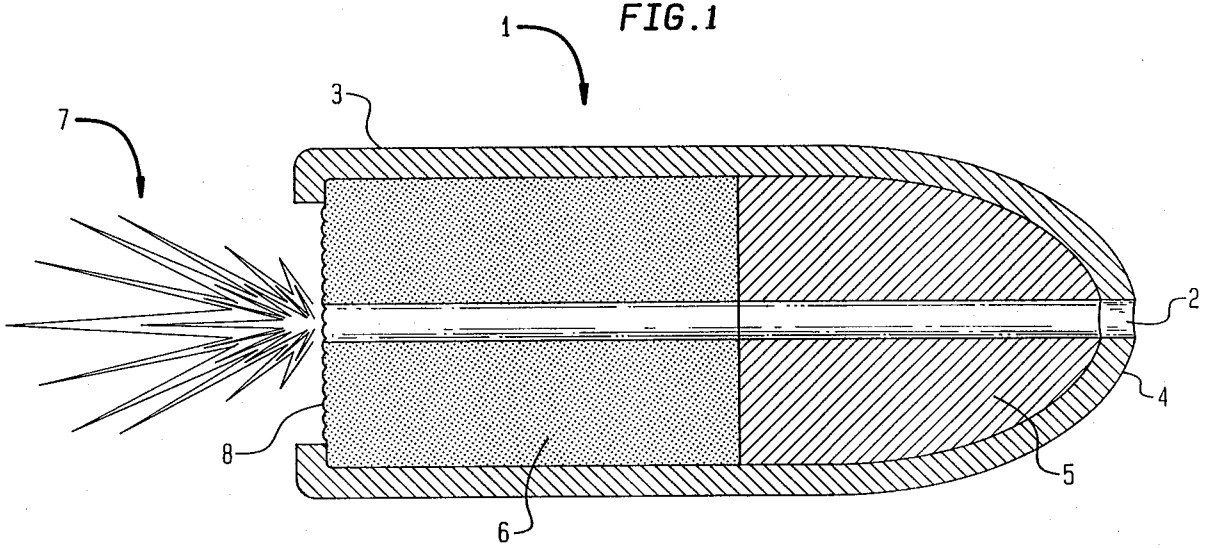

This invention can be best understood when described in its embodiment illustrated in the FIGURE wherein a generally cylindrical bullet shaped projectile 1 has an axial orifice 2 completely therethrough from the nose 4 to the tail 8 at its central longitudinal axis. The orifice 2 has a very small diameter and need only be large enough to allow air to pass through as the projectile 1 is moving through the air. The outer jacket 3 of the projectile 1 is made of a metal which is capable of engaging the rifling in the barrel of a firearm used to propel it toward the atmospheric area to be analyzed. The jackets commonly used for tracer bullets are satisfactory for use in the projectile 1 of this invention.

Inside the nose 4 of the projectile 1 is a lead filler 5 to insure the proper weight distribution which will cause the projectile 1 to move in the air, nose 4 first. Behind the lead filler 5, toward the rear or tail 8 of the projectile 1, is a pyrotechnic composition 6 used to analyze the air by means of its flame upon combustion. A typical pyrotechnic composition 6 of this invention, and one preferred for detecting halogens according to this invention, comprises magnesium which acts as a fuel so the pyrotechnic composition burns, calcium resinate which acts as a binder for the fuel and strontium nitrate which is an oxidizer and provides the color of the flame by oxidizing(burning) the materials in the atmosphere. The relative weight proportions of the components of the pyrotechnic composition are about 10–30 weight percent magnesium, about 5–10 weight percent calcium resinate and about 60–80 weight percent strontium nitrate.

The total amount of pyrotechnic composition 6 present in each projectile 1 can vary between 0.5 and 5 grams depending on the caliber of the projectile 1.

If the atmosphere through which the projectile 1 is propelled is a nontoxic atmosphere, the color of the flame 7 emitted therefrom remains unchanged. However, if there is a toxic chemical in the atmosphere through which the projectile 1 travels, the color changes and becomes red if the toxic chemical contains, e.g. a halogen such as chlorine, e.g. mustard gas, phosgene, chlorophos, Vapon(2,2-dichlorovinyl dimethylphosphate) or Adamsite(10-chloro-5,10-dihydrophenarsazine) and the like.

If the toxic agent in the atmosphere contains another halogen, e.g. fluorine, such as Soman[Merck Index #8489 (9th Edition)] or Sarin[Merck Index #8127 (9th Edition)] the color of the flame becomes red.

Other toxic agents which can be detected by means of the projectile of this invention are tear gas, Lewisite, Adamsite and Yperite. These agents are observed because they cause the flame to become red.

The diagnosis of the color changes in the flame of the projectile of this invention is accomplished by use of a spectrophotometer. One can also use the naked eye and binoculars or a telescope, but at long distances, they might not be reliable.

When practicing the invention, one propels the projectile and as it flies through the air, samples pass through its orifice and enter into the pyrotechnic reaction causing changes of the specific spectral lines of emission, enabling detection of and analysis of toxic materials present. For example, if the toxic agent contains chlorine, the spectral lines of emission are enhanced from 300–500 millimicrons to 600–680 millimicron.

What is claimed is:

1. A projectile for use in the detection of toxic chemicals while in flight through the atmosphere after expulsion from a weapon consisting essentially of:

a projectile body having a forward lead-filled nose portion and a rearward charge portion, a pyrotechnic charge positioned in said rearward charge portion being ignitable upon expulsion from a weapon, an axial opening passing longitudinally through said entire projectile body, said forward lead-filled nose, and said pyrotechnic charge portion, whereby, said pyrotechnic charge upon ignition produces a flame which upon contact with the atmosphere containing a toxic chemical produces a color change after said atmosphere passes through said axial opening and contacts said flame.

2. The projectile of claim 1 wherein the pyrotechnic charge consists of magnesium, calcium resinate, and strontium nitrate.

* * * * *